April 28, 1970 G. S. LAWRIE ET AL 3,509,299
ACCELERATION SENSOR SWITCH
Filed Nov. 25, 1968

INVENTORS.
GEORGE S. LAWRIE
GARY W. ROSE
BY
Dominick Nardelli
ATTORNEY

United States Patent Office 3,509,299
Patented Apr. 28, 1970

3,509,299
ACCELERATION SENSOR SWITCH
George S. Lawrie, Don Mills, and Gary W. Rose, Brampton, Ontario, Canada, assignors to The Garrett Corporation, Los Angeles, Calif., a corporation of California
Filed Nov. 25, 1968, Ser. No. 778,620
Int. Cl. H01h 35/14
U.S. Cl. 200—61.53
8 Claims

ABSTRACT OF THE DISCLOSURE

An acceleration sensor switch having a simplified rigid construction wherein a mass is retained at a rest position by a spring such that when the mass is subjected to a predetermining acceleration, it moves from the rest position, striking a contact element to move the latter into a latched position between two electrodes. When the acceleration force is removed, the spring moves the mass back to the rest position; but the contact element, being free from the action of the spring, remains in the latched position until manually unlatched.

---

This invention relates to an electric switch and, more particularly, to a switch that closes an electric current when subjected to a predetermined acceleration acting for a predetermined period of time.

Switches of this type find many applications, for example, they aid a searching party to find crashed vehicles such as aircraft. In these applications the switches are used to close circuits, in turn, activating radio transmitters and fire extinguishers.

An object of this invention is to provide a simple, economical rigid switch that responds to acceleration forces such as are present during an aircraft crash but the switch remains relatively insensitive to short duration impulses such as normal aircraft vibrations and ground handling shocks.

Another object of this invention is to provide an acceleration sensor switch which remains passively in the latched position.

These and other objects and features of advantages will be further understood by reference to the following specification and the drawing wherein.

Figure 1:
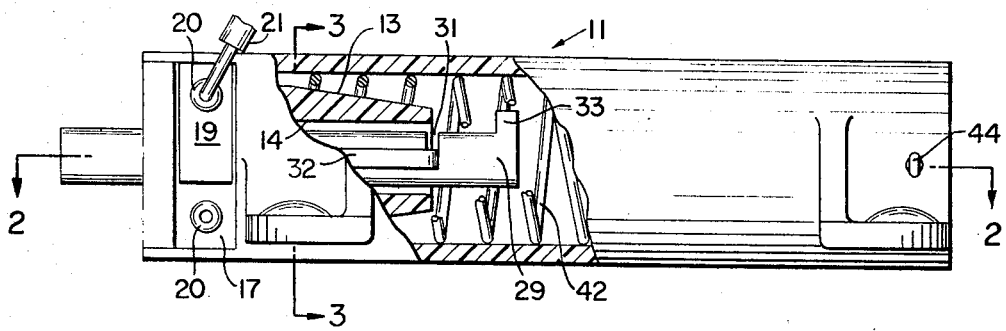
FIG. 1 is an elevation of the novel switch in partial section.
Figure 2:
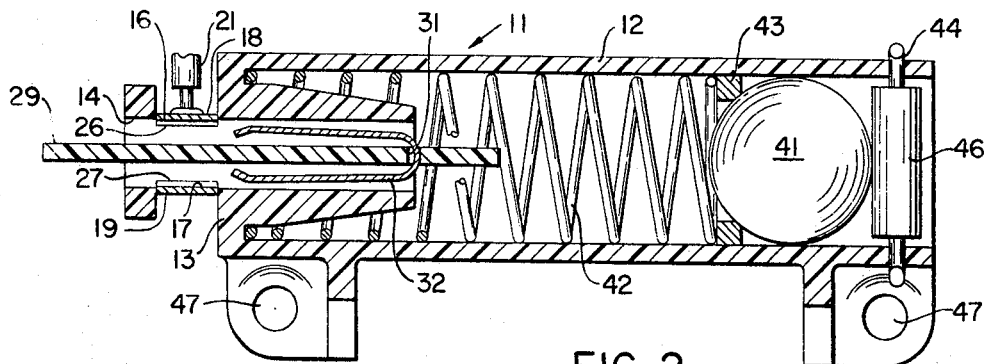
FIG. 2 is a plan section of the switch taken on line 2—2 of FIG. 1 in the direction of the arrows showing the switch in the open position.
Figure 4:
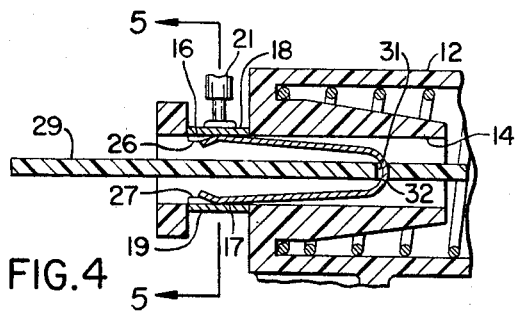
FIG. 4 is a plan section of a portion of the switch showing the switch in the closed position.
Figure 5:
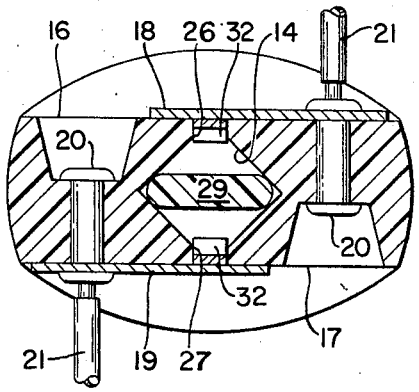
FIG. 5 is an enlarged section of the switch taken on line 5—5 of FIG. 4 in the direction of the arrows.
Figure 3:
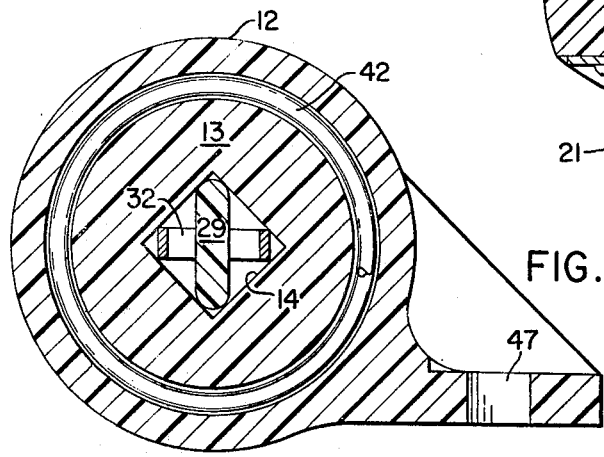
FIG. 3 is an enlarged section of the switch taken on line 3—3 of FIG. 1 in the direction of the arrows.

Referring to the drawing, the switch has a casing 11 made of a suitable material, for example, a thermoplastic, having strength, lightness, dimensional stability and electrical insulating properties. The casing has a cylindrical wall 12 and a plug 13 integrally fixed at one end of the cylindrical wall (more clearly shown in FIG. 2). The plug 13 has a square hole 14 axially aligned, as shown in FIG. 3. Formed on the plug 13 are parallel surfaces 16 and 17 (more clearly shown in FIG. 5) that are also parallel to the axis of the switch. In addition, the surfaces 16 and 17 are aligned so that a diagonal of the square hole 14 is perpendicular to both surfaces 16 and 17 and the spacing therebetween is equal to the length of the diagonal. On surfaces 16 and 17 are disposed electrodes 18 and 19, respectively, made of, for example, silver-plated brass and suitably fixed to the surfaces by rivets 20. Rivets 20 are also the contact points for electric leads 21. In the region of the electrodes, slots 26 and 27 are formed in the plug 13 so that the hole 14 communicates with both electrodes 18 and 19. Within the hole 14 is disposed a plunger 29 also made of plastic. Plunger 29 has a substantially rectangularly cross-section and is oriented parallel to surfaces 16 and 17 as shown in FIG. 5, and is disposed in sliding relation within hole 14. The plunger 29 has a cut 31 (FIG. 1) wherein is disposed a bight-shaped contact element 32 made of, for example, gold plated beryllium copper having good electrical conductivity and a relatively high modulus of elasticity. The plunger 29 has a length such that, when the element 32 is in the position as shown in FIG. 2, one end of the plunger protrudes beyond the plug 13 into the casing 11. In addition, the plunger 29 has, at its inner end, a tab 33 which prevents the plunger from being removed by moving the plunger to the left, as viewed in FIG. 1. Whenever the tab 33 contacts the plug 13, the ends of the contact element 32 spring outward from their position, as shown in FIGS. 2 and 3, into detents or slots 26 and 27 and make contact with the electrodes 18 and 19, as shown in FIGS. 4 and 5.

The plunger 29 moves to the left when a mass 41 which is preferably spherical is displaced by a rapid change in velocity, either an acceleration or deceleration as the case may be, depending on the relative orientation of the switch to the vehicle on which it is mounted. In order to control the response of the switch with respect to the magnitude and duration of the acceleration to which the switch is responsive, a compression spring 42 is disposed within the cylindrical wall 12. The spring 42 reacts between the closed end near plug 13 and a washer 43. The mass 41 is retained with the casing 11 by a suitable cotter pin 44, holding a plastic sleeve 46. By well known means, the spring constant (spring rate), the mass, and the distance of free travel of the mass may be chosen to obtain the desired static and dynamic responses. In a typical embodiment of the invention, these values may be chosen to yield a static response such that the electrical circuit will be closed when the switch is subjected to a steady-state acceleration of more than five times the acceleration of gravtiy and having a duration of at least twenty milliseconds, or a dynamic response in the form of a transient acceleration impulse whose integrated value is equivalent to an instantaneous velocity change of over three feet per second.

If the switch is to be used on an aircraft to turn on, for example, a radiotransmitter when the plane crashes, the switch is installed on the aircraft with its axis parallel to the craft axis with the mass 41 disposed in the rear. In this position, the switch senses a negative acceleration or deceleration, in that, when the aircraft comes to an abrupt stop, the mass 41 will continue to move to the left, as viewed in FIG. 1, even though the casing 11 has stopped with the aircraft, as the casing has been bolted thereto by suitable bolts (not shown) through bolt holes 47. The mass overcomes the force of the spring 42 and compresses it. When the spring compresses sufficiently, the mass then moves the plunger 29 and contact element 32 to the left and stops when tab 33 contacts the plug 13. The ends of element 32 springs outward into slots 26 and 27, connecting electrodes 18 and 19 together. The spring action of the element 32 latches the switch closed even after the spring 42 urges the mass 41 to the right. In addition, detent means (not shown) may be provided on either elements 18, 19 or 32 or all to give additional resistance to disengagement between element 32 and electrodes 18 and 19 which disengagement may result from subsequent accelerations. When the circuit is to be opened the plunger 29 may be manually pushed back into the casing 11 by suitable means, not shown. The friction force between the contact element, and the sides of the square hole 14 hold the plunger 29 in place.

The switch could also be used to close circuits at a predetermined upward acceleration by simply altering the position of the switch on the craft as may be required, for example, on a helicopter. That is, the mass 41 is placed facing the top of the craft so that an abnormally large upward acceleration causes the mass 41 to compress the spring 42 and to push the plunger 27. Accordingly, the invention is not limited to the exact details of the illustrated embodiment, but includes all such modifications and variations coming within the scope of the claims.

What is claimed is:
1. An acceleration sensor switch comprising:
a casing of electrically non-conductive material,
electrode elements positioned at one end of said casing,
a mass movable within said casing in response to acceleration forces,
means positioned within said casing to continuously bias said mass away from said electrode elements,
electrical contact means disposed within said casing to contact said electrode elements when acted upon by said mass in response to a predetermined acceleration over the mass biasing means, and
means to hold said electrical contact means in contact with said electrode elements when said mass returns to the normally biased position away from said electrode elements.

2. An acceleration sensor switch comprising:
a cylindrical casing of electrically non-conductive material including a first end portion enclosing one end and a second end portion enclosing the other end, said first end portion having a shaped opening extending therethrough.
a spherical mass movable within said cylindrical casing in response to acceleration forces;
means positioned within said casing to bias said spherical mass towards the second end portion of said cylindrical casing;
a pair of electrode elements positioned within the shaped opening of said first end portion; and
a plunger element slidably positioned within the shaped opening in the first end portion of said casing and having one end extending into said casing, said plunger element including an electrical contact element to contact said electrode elements when said plunger is acted upon by the spherical mass in response to a predetermined acceleration.

3. The acceleration sensor switch of claim 2 wherein said contact element has a bight shape and is of spring material to hold said element in contact with said electrodes by friction.

4. The acceleration sensor switch of claim 2 and in addition means to hold said electrical contact element in contact said electrode elements when said spherical mass returns to the normally biased position towards the second end portion of said cylindrical casing.

5. The acceleration sensor switch of claim 4 wherein the other end of said plunger extends outward from said cylindrical casing to permit the contact between the electrical contact element and said electrode elements to be broken from the exterior of said casing.

6. The acceleration sensor switch of claim 2 wherein the shaped opening extending through the first end portion of said cylindrical casing includes a pair of detents in which said pair of electrode elements are respectively disposed and which receive the electrical contact elements of said plunger.

7. The acceleration sensor switch of claim 3 wherein said shaped opening in said first end portion of said casing is substantially square and said bight shape spring contact elements include two flat ends which extend diagonally across two opposed corners of said substantially square shaped opening.

8. The acceleration sensor switch of claim 7 wherein said plunger element is substantially rectangular with rounded corners to slide between the two opposed corners of said substantially square shaped opening intermediate the two opposed corners across which the contact element flat ends extend.

References Cited

UNITED STATES PATENTS

| 1,763,649 | 6/1930 | Goetz | 200—163 |
| 2,777,911 | 1/1957 | Cox | 200—77 |
| 3,380,046 | 4/1968 | Paonessa | 200—61.45 |

FOREIGN PATENTS

| 635,672 | 4/1950 | Great Britain. |
| 798,648 | 3/1936 | France. |

ROBERT K. SCHAEFER, Primary Examiner

M. GINSBURG, Assistant Examiner